Figure 6:
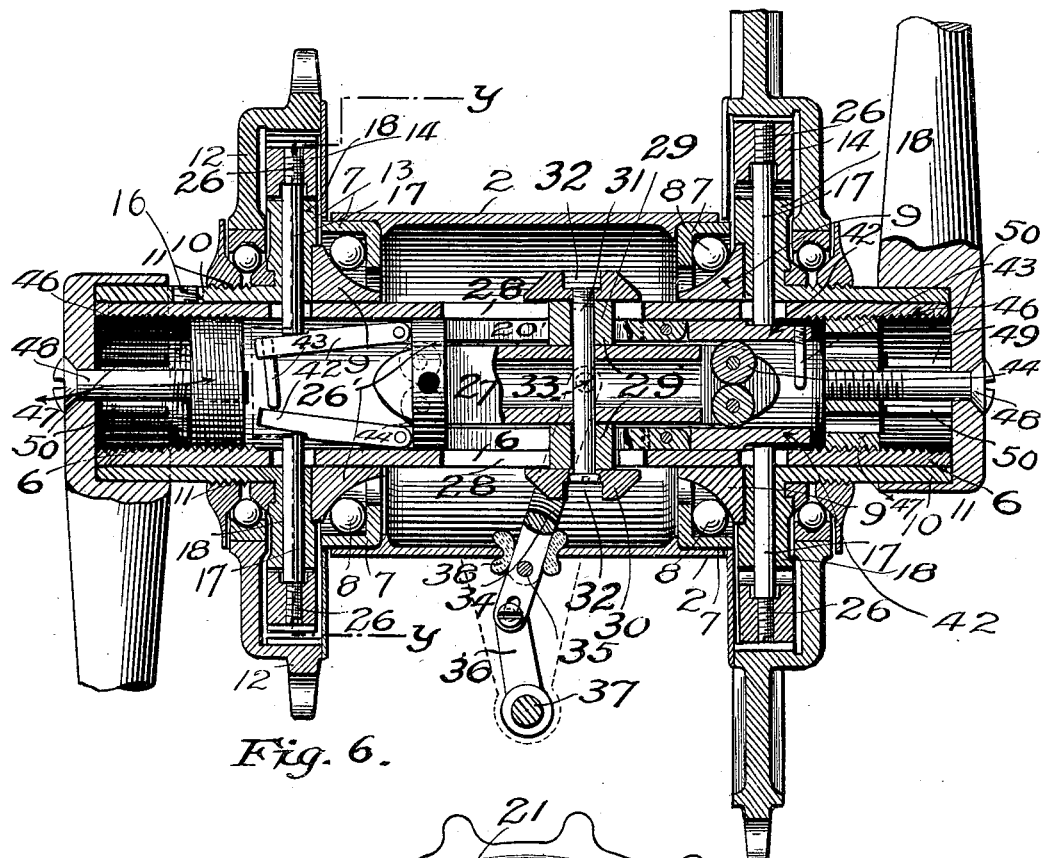

No. 622,029. Patented Mar. 28, 1899.
E. A. YOUNG & I. T. DRAKE.
VARIABLE SPEED GEAR FOR BICYCLES.
(Application filed Mar. 22, 1897.)
(No Model.) 2 Sheets—Sheet 1.
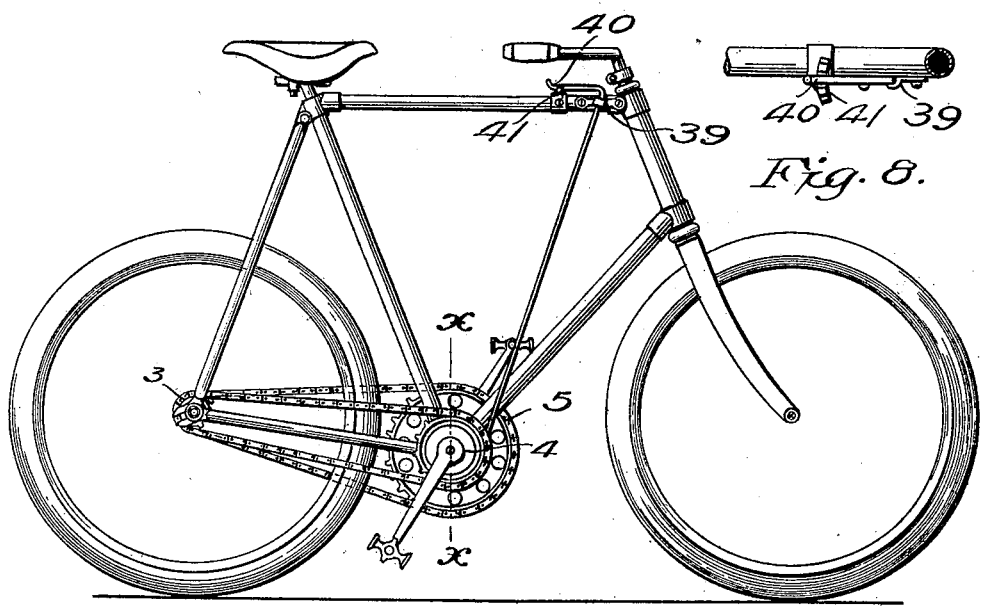
Fig. 1.
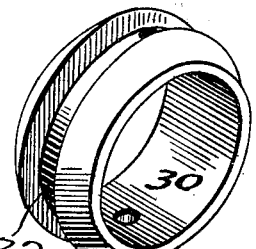
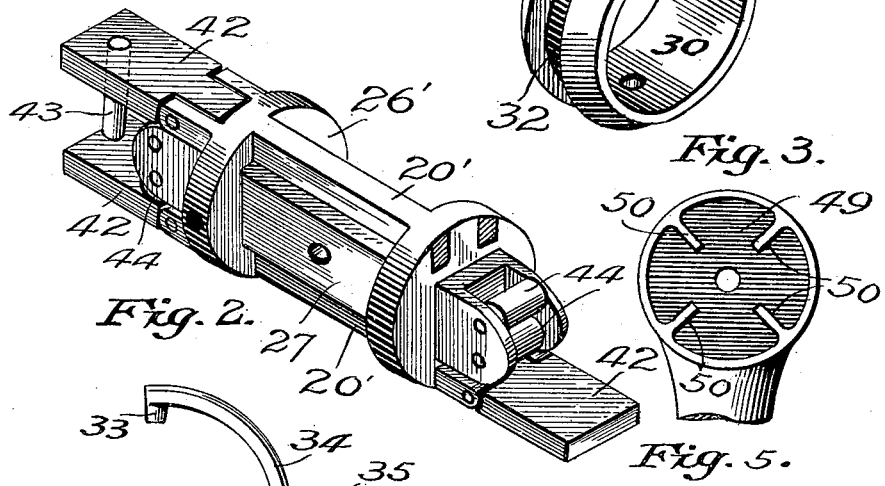
Witnesses:
Chas. E. VanDolin
W. H. Baxter
Inventors:
Edwin A. Young,
Isaac T. Drake,
By Geo. E. Young,
their attorney.
THE NORRIS PETERS CO., PHOTO-LITHO., WASHINGTON, D. C.

No. 622,029. Patented Mar. 28, 1899.
E. A. YOUNG & I. T. DRAKE.
VARIABLE SPEED GEAR FOR BICYCLES.
(Application filed Mar. 22, 1897.)
(No Model.) 2 Sheets—Sheet 2.

Witnesses:
Chas. E. Van D...
W. H. Baxter

Inventors:
Edwin A. Young,
Isaac T. Drake,
By Geo. E. Young
their attorney,

UNITED STATES PATENT OFFICE.

EDWIN A. YOUNG AND ISAAC T. DRAKE, OF MADELIA, MINNESOTA.

VARIABLE-SPEED GEAR FOR BICYCLES.

SPECIFICATION forming part of Letters Patent No. 622,029, dated March 28, 1899.

Application filed March 22, 1897. Serial No. 628,621. (No model.)

*To all whom it may concern:*

Be it known that we, EDWIN A. YOUNG and ISAAC T. DRAKE, citizens of the United States, residing at Madelia, in the county of Watonwan and State of Minnesota, have invented certain new and useful Improvements in Bicycles, of which the following is a specification.

Our invention relates to a two-speed drive-gearing for bicycles.

The objects of our invention are to provide a bicycle with both low and high gears, one to be used in riding upgrade or in sandy or muddy roads and the other, the high gear, to be used on downgrades or upon level and good roads and for racing; second, to afford facilities for the easy adjustment of the gearing, which will enable the rider to change his wheel from the low to the high gear, or vice versa, while riding and without dismounting or lifting his feet from the pedals; third, to provide for the easy adjustment of the gearing, by which both sprockets may be thrown out to enable the rider to coast downhill without removing his feet from the pedals; fourth, to provide for the easy and exact adjustment of the ball-bearings, and, finally, to construct or provide a two-speed gear for bicycles which will possess the qualities of cheapness, lightness, and compactness.

With these ends in view our invention consists in the combination, with the frame of the bicycle and its crank-hanger or box, of the shaft, the bearings therefor in said crank-hanger, webs carried by said shaft, the sprocket-wheels loosely journaled upon said shaft, pawls or like clutch devices upon said webs to engage with said sprockets, respectively, and means, in connection with the shaft and operative from the exterior of said crank-hanger, for engaging either of said pawls with its respective sprocket-wheel or disengaging both of said sprockets; and our invention further consists in particular means for securing the crank upon said shaft; further, in a hollow shaft and in particular slidable and expanding devices arranged therein and whereby said pawls are controlled; further, in a particular form of the bearings for the shaft and for the sprockets, and, further, the invention consists in particular constructions and in combinations of parts, all as hereinafter described, and particularly pointed out in the claims.

The invention will be more readily understood by reference to the accompanying drawings, wherein—

Figure 7:
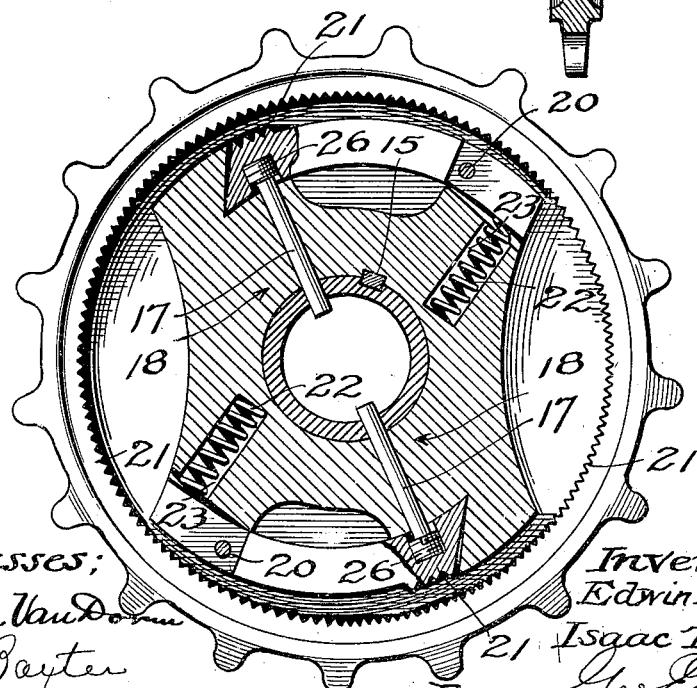

Figure 1 is an elevation of a bicycle embodying our invention. Fig. 2 is a detailed view showing the shuttle and the expanding devices employed within the hollow shaft, one of the jaws being broken away. Fig. 3 is a perspective view of the sliding collar employed on the shaft and connected with said shuttle. Fig. 4 is a view of the fork by which the collar is moved. Fig. 5 is an inside view of the end of the pedal-crank. Fig. 6 is an enlarged sectional view on the line X X of Fig. 1. Fig. 7 is a transverse vertical section on the line Y Y of Fig. 6. Fig. 8 is a plan of the notched bar used on the frame of the bicycle to secure the hand-lever.

The bicycle-frame is of the ordinary construction, and 2 represents its crank-hanger or box. The shaft of the rear wheel is long enough to accommodate the two small sprockets 3. These are connected, respectively, with the small or low-speed sprocket 4 and the high-speed sprocket 5, which last is used in riding over common roads.

Referring to Figs. 6 and 7, 6 represents a hollow shaft which has ball-bearings in the ends of the hanger or box 2. These bearings are constituted by the angle-rings 7, the balls 8, and the cones 9, which last are upon the shaft and are held in position by the sleeves 10, one of which is arranged on each end of the shaft. The sleeve 10 is provided with threads 11 for the bearing-rings of the sprocket 12. Each sleeve has an integral web or arms 13, which carry the pawls 14, adapted to engage with the sprocket. The sleeve 10 is secured upon the hollow shaft by means of a key 15 (shown in Fig. 7) and also by a set-screw 16 (shown in Fig. 6) and whereby a movement of the sleeve on the shaft is prevented after it is adjusted. The longitudinal movement of the sleeve is employed as a means to adjust the inner cone 9 of the ball-bearings against which it abuts. The pawls 14 and the internal surface of the sprocket-wheel are notched or toothed to insure a strong engagement between the same. Holes are drilled in the web or arms 18 to receive the plunger-pins 17, which pins being forced outwardly will move the pawls 14 into engagement of the internal surface of the sprocket. When this is done, it is obvious that as the web is firmly secured to the shaft the sprocket will be also, and the latter will revolve therewith, and that the driving power upon the cranks will be transmitted to the rear wheel through the sprocket-chain shown in Fig. 1. The particular construction of the pawls, pins, web, and sprocket is clearly shown in Fig. 7. The pawls are preferably curved and are pivoted upon pins 20 in the web. They are held in alinement by their arrangement in slots cut in the web or teeth in the sprocket. The ratchet-teeth 21 of the pawl and sprocket may be of any desired form, but the equilateral form shown is preferred. The rear end of each pawl is engaged by a spring 22, set in a recess 23, set in the web or arm, and this spring normally holds the pawl out of engagement with the sprocket. The pins 17 move freely in the holes or guideways. Their inner ends project into the hollow shaft. At one end the pins may extend through round holes while at the other end of the shaft slots should be provided therefor to allow for longitudinal adjustment of the shaft as required for accurate and proper adjustment of the ball-bearings.

To provide for a nice adjustment of the pins 17 and the pawls, we preferably provide screw abutments 26 in the several pawls, which being moved in or out determine the working lengths of the pins 17, of which they are a working part, and no adjustment of the expansion device within the shaft therefore need be provided for. This screw-adjustment of the pins may be in various forms, but we prefer to use one or the other of the forms shown in Figs. 6 and 7. Centrally within the shaft is the cage or guide 26', preferably provided with a rectangular hole to receive the similarly-shaped shuttle 27. The cage or guide 26' and the shaft 6 are provided with slots 28 to receive the blocks 29, which extend from the shuttle through the slots into engagement with the sliding collar 30 on the shaft. The parts are fastened together by a pin or bolt 31, which passes through the shuttle. The collar is provided with an annular groove 32 to permit the same to rotate and receive the lugs 33 of the fork-lever 34. The fork is arranged within the crank-hanger, as shown in Fig. 6, and is pivoted on the hanger at 35. Its outer end is connected to the end of the crank 36 which is on the lower end of the operating-rod 37. The bearings for this rod are preferably provided on the crank-hanger, and to prevent the entrance of dust on the inside of the crank-hanger the opening through which the fork-lever extends is packed with a ring or pieces 38 of rubber or leather, or a metallic slide may be used. The operating-rod is shown in Fig. 1. The same extends upward to a light bearing 39 on the upper bar or the head of the bicycle-frame, and the upper end of the rod is preferably bent back to form a hand-lever 40, the end of which is held in one of the three notches in bar 41 on the frame. There is enough spring in the handle 40 to permit its being shifted from one notch to the other of the bar 41. When the handle 40 is operated, the collar 30 and the shuttle 27 are moved longitudinally in the shaft, and the movement of the shuttle will expand or distend the hinged jaws or levers 42, which hinge upon the ends of the parts 20'. There are two jaws in each end of the shaft, and the shuttle forces between them. The plunger-pins 17 engage with these jaws or levers, and when either pair of the latter is distended or separated the plunger-pins corresponding thereto will be forced outward and move the pawls 14 into engagement with the ratchet service of the sprocket-wheel. To prevent collapsing of the levers 42, one of each pair is preferably provided with a pin 43 to hold them apart, as shown at the left hand of Fig. 6. The shuttle is preferably provided with antifriction-rollers 44 at each end, and the shuttle has enough latitude of movement to carry the rollers directly beneath the points of engagement between the jaws 42 and the plunger-pins. Also the shuttle is of such length that when moved to a middle position neither pair of jaws will be distended, in which case neither sprocket will be connected with the shaft. This is the condition when coasting. We prefer to employ special fastenings for the cranks upon the shafts, arranging the same so as to relieve the ball-bearings of strain. The shaft has an internal thread 46 to receive the threaded plug 47, which in turn receives the end of a screw or bolt 48, the head of which is countersunk in the crank-head. The crank has a recess 49 in its inner side to admit the end of the shaft and of the sleeve thereon. It also has the inwardly-extending radial lugs 50, which are accommodated in notches made in the shaft or sleeve and by which movement of one with respect to the other is prevented. When the screw 48 is tightened, the crank will be jammed firmly against the outer end of the sleeve 10. By this means a solid and durable crank-fastening is made. The end of the shaft is not engaged by the crank, a little space being left to allow adjustment of the sleeve on the shaft.

The operation of the device is as follows: By throwing the hand-lever 40 into one of the outside notches in the bar on the frame the rider will connect the corresponding sprocket with the shaft. The movement of the hand-lever operates the fork within the crank-hanger and therewith the collar upon the shaft and with this the shuttle connected therewith within the shaft. The outward movement of the shuttle expands or distends the jaws or levers 42, thus forcing the plunger-pins outward and raising or moving dogs or pawls 14 firmly into engagement with the internal surface of the sprocket. If this sprocket is the larger one, the wheel will be in condition for speeding. If, on the other hand, the smaller sprocket is connected with the shaft by movement of the shuttle, the wheel may be used for slow or easy riding or for the climbing of hills, all with but little difficulty, owing to the increased leverage gained upon the rear sprocket 3 and the rear wheel. When the shuttle is moved away from between the plunger-pins, the pawls are forced back by the springs 28 beneath said pawls, thereby releasing the sprocket from the shaft. Further, as before stated, the shuttle may be adjusted midway of the shaft and both sprockets freed therefrom. In this case the sprockets revolve freely upon suitable ball-bearings carried by the shaft.

It is obvious that many alterations and changes will readily suggest themselves to one skilled in the art, and we therefore do not confine ourselves to the specific instructions herein shown and described.

Having thus described our invention, we claim as new and desire to secure by Letters Patent—

1. The combination, with the bicycle crank-hanger, of the shaft journaled therein, the sprocket-wheel journaled upon said shaft, the clutch device secured upon said shaft and adapted to engage said sprocket-wheel, the plunger-pin for operating said clutch device, a shuttle longitudinally movable within said shaft to project said pin and said clutch device, and non-revoluble means for operating said shuttle, substantially as described.

2. The combination, with the bicycle crank-hanger, of the shaft journaled therein, the sprocket-wheels journaled upon opposite ends of said shaft, and each carrying a pawl or clutch adapted to engage with a respective sprocket or gear wheel, laterally-movable pins provided in said parts or disks to operate said pawls or clutches, and an independent and longitudinally movable shuttle provided within said shaft to project said pins, substantially as described.

3. The combination, with the crank-hanger, of the shaft journaled therein, the sprocket-wheel journaled upon said shaft, the disk secured to said shaft and carrying a pawl to engage said sprocket or gear wheel, the shuttle revoluble with the shaft and longitudinally movable within the same, means for operating said shuttle, and a part engaging said pawl and extending within said shaft to be operated by said shuttle, substantially as described.

4. The combination, of the hollow shaft and the bearings therefor, with the wheel to rotate about said shaft, a pawl or clutch part carried by said shaft, the laterally-movable pin also carried thereby, to actuate said pawl or clutch part, the lever or jaw within said shaft, to actuate said pin, and means for operating said lever substantially as described.

5. The combination, of the hollow shaft with the crank-hanger, the bearings therein for said shaft, the sprocket-wheel to revolve on said shaft, the laterally-movable pawl or clutch part to engage said sprocket-wheel, the pivoted jaw or lever within said shaft, the means within said crank-hanger to operate said jaw or lever, and, through the same operate said pawl or clutch part substantially as described.

6. The combination, of the hollow shaft, and the bearings therefor with the wheel to rotate about said shaft, the laterally-movable pawl or clutch part carried by the shaft to engage said wheel, the jaw or lever arranged within said shaft and operatively connected with said pawl, the shuttle arranged within said shaft, the collar provided upon the shaft and wherewith said shuttle is operated, and the fork or lever for moving said collar, as and for the purpose specified.

7. The combination, of the hollow shaft with the shuttle within said shaft, the slot in said shaft, the collar upon said shaft and connected with said shuttle through said slot, means for moving said collar upon said shaft, the hinged jaw or lever arranged within the shaft to be engaged by said shuttle, the web or arm upon said shaft, the pin movable in said web and engaging said jaw or lever, the pawl held in said web or arm and wherewith said pin engages, and the sprocket-wheel freely revoluble about said shaft and into engagement with which said pawl is adapted to be moved by the movement of said shuttle substantially as described.

8. The combination, with the shaft, of the shuttle, the jaws or levers to be distended thereby, the pawls or clutch parts carried by said shaft, the pins also carried thereby and engaging with said pawls and with said jaws and said shuttle arranged to be moved beneath said jaws at the point of contact between the same and said pin substantially as described.

9. The combination, of the shaft, with the bearings thereof, the sprockets freely revoluble about said shaft, laterally-movable clutch parts upon said shaft, the plunger-pins to engage therewith, means for distending and projecting said plunger-pins, and, the adjustable abutments carried by said clutch parts for said pins, substantially as described.

10. The combination, of the hollow shaft and bearings therefor, with the shuttle movable within said shaft and having antifriction-rollers, the jaws or levers within the shaft to be engaged by said rollers, the sprocket-wheel, and the clutch parts operated by said jaws or levers substantially as described.

11. The sprocket-clutch, comprising the shaft and the web carried thereby, in combination with pawls pivoted upon said web, springs in the web to normally hold said pawls against the web, the sprocket-wheel, said sprocket-wheel and said pawls having teeth to engage when said pawls are distended, and means upon the shaft for distending said pawls, substantially as described.

In testimony whereof we have hereunto set our hands this 8th day of March, A. D. 1897.

EDWIN A. YOUNG.
   ISAAC T. DRAKE.

In presence of—
 C. G. HAWLEY,
 GEO. E. YOUNG.